(12) United States Patent
Liu

(10) Patent No.: US 10,951,484 B1
(45) Date of Patent: Mar. 16, 2021

(54) CUSTOMIZED CALL MODEL GENERATION AND ANALYTICS USING A HIGH-LEVEL PROGRAMMING INTERFACE

(71) Applicant: 8x8, Inc., San Jose, CA (US)

(72) Inventor: Zhishen Liu, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 180 days.

(21) Appl. No.: 16/013,595

(22) Filed: Jun. 20, 2018

Related U.S. Application Data

(60) Provisional application No. 62/524,002, filed on Jun. 23, 2017.

(51) Int. Cl.
| | | |
|---|---|---|
| H04L 29/06 | (2006.01) | |
| H04L 29/08 | (2006.01) | |
| H04L 12/24 | (2006.01) | |
| G06F 9/54 | (2006.01) | |
| G06F 8/35 | (2018.01) | |
| G06F 16/27 | (2019.01) | |

(52) U.S. Cl.
CPC ............... *H04L 41/14* (2013.01); *G06F 8/35* (2013.01); *G06F 9/547* (2013.01); *G06F 16/27* (2019.01); *H04L 67/42* (2013.01)

(58) Field of Classification Search
CPC . H04L 41/14; H04L 67/42; G06F 8/35; G06F 9/547; G06F 16/27
USPC ........................................................ 709/223
See application file for complete search history.

(56) References Cited

U.S. PATENT DOCUMENTS

| | | | |
|---|---|---|---|
| 6,829,348 B1 * | 12/2004 | Schroeder .............. | G06Q 30/02 379/265.02 |
| 7,403,604 B2 | 7/2008 | Mundra et al. | |
| 8,064,909 B2 | 11/2011 | Spinelli et al. | |
| 8,401,163 B1 * | 3/2013 | Kirchhoff ......... | H04L 29/06197 370/356 |

(Continued)

FOREIGN PATENT DOCUMENTS

WO      0135579      5/2001

OTHER PUBLICATIONS

"Cisco Hosted Unified Communications Services", Cisco Product Data Sheet, Jun. 18, 2007 (retreived May 31, 2016) http://www.cisco.com/c/en/us/products/collateral/unified-communications/product_data_sheet0900aecd80670040.html.

*Primary Examiner* — Tonia L Dollinger
*Assistant Examiner* — Schquita D Goodwin
(74) *Attorney, Agent, or Firm* — Crawford Maunu PLLC

(57) ABSTRACT

Certain aspects of the disclosure are directed to customized communication monitoring and alerts using a high-level programming interface. According to a specific example, a data communications server is configured and arranged to provide a database with virtual office features available to remotely-situated client entities. The data communications server is configured to provide to the client entities, a set of instructions written in a first programming language that defines a message exchange protocol. The data communications server is further configured to receive from each client entity, client-specific sets of control data written in a second programming language that is compatible with the first programming language. The data communications server may accumulate data from communication event data based on the client-specific sets of control data, evaluate the accumulated data for one or more parameters of interest, and (Continued)

generate communication models for the disparate client entities.

20 Claims, 6 Drawing Sheets

(56) References Cited

U.S. PATENT DOCUMENTS

| | | |
|---|---|---|
| 8,656,417 B2 | 2/2014 | May |
| 8,918,867 B1 | 12/2014 | Salour |
| 8,948,358 B1 | 2/2015 | Rengarajan et al. |
| 8,964,726 B2 | 2/2015 | Lawson et al. |
| 9,137,127 B2 | 9/2015 | Nowack et al. |
| 9,160,696 B2 | 10/2015 | Wilsher et al. |
| 9,240,966 B2 | 1/2016 | Wilsher et al. |
| 9,270,833 B2 | 2/2016 | Ballai et al. |
| 9,294,433 B1 | 3/2016 | Salour |
| 9,294,515 B2 | 3/2016 | Sayko |
| 9,306,982 B2 | 4/2016 | Lawson et al. |
| 9,338,064 B2 | 5/2016 | Stratton et al. |
| 9,344,573 B2 | 5/2016 | Wolthuis et al. |
| 9,407,597 B2 | 8/2016 | Lawson et al. |
| 9,426,116 B1 | 8/2016 | Salour |
| 9,455,949 B2 | 9/2016 | Lawson et al. |
| 9,456,008 B2 | 9/2016 | Lawson et al. |
| 9,459,925 B2 | 10/2016 | Lawson et al. |
| 9,459,926 B2 | 10/2016 | Shakirzyanov et al. |
| 9,949,000 B1 * | 4/2018 | Liu .................... H04M 7/009 |
| 10,530,935 B1 * | 1/2020 | Britt .................... H04M 7/0084 |
| 10,705,690 B1 * | 7/2020 | Mehta ................ H04L 12/1822 |
| 2007/0047571 A1 | 3/2007 | Kandikonda et al. |
| 2007/0091800 A1 | 4/2007 | Corcoran |
| 2007/0115942 A1 | 5/2007 | Money et al. |
| 2008/0125077 A1 | 5/2008 | Velazquez et al. |
| 2009/0201916 A1 | 8/2009 | Caron et al. |
| 2010/0128709 A1 | 5/2010 | Liu et al. |
| 2010/0130228 A1 * | 5/2010 | Vendrow ............... H04W 40/20 455/456.1 |
| 2010/0142516 A1 | 6/2010 | Lawson et al. |
| 2010/1023594 | 9/2010 | Lawson et al. |
| 2011/0170681 A1 | 7/2011 | Kole et al. |
| 2011/0320550 A1 | 12/2011 | Lawson et al. |
| 2012/0208495 A1 | 8/2012 | Lawson et al. |
| 2012/0304245 A1 | 11/2012 | Lawson et al. |
| 2013/0072153 A1 | 3/2013 | Lawson et al. |
| 2013/0212603 A1 | 8/2013 | Cooke et al. |
| 2013/0218547 A1 * | 8/2013 | Ostermeyer ............ G06F 30/20 703/13 |
| 2013/0304929 A1 | 11/2013 | Fahlgren et al. |
| 2014/0044123 A1 | 2/2014 | Lawson et al. |
| 2014/0105372 A1 | 4/2014 | Nowack et al. |
| 2014/0270109 A1 | 9/2014 | Riahi et al. |
| 2016/0134616 A1 * | 5/2016 | Koushik .................. H04L 63/08 726/9 |
| 2016/0241606 A1 * | 8/2016 | Calamera ............ H04L 65/1069 |
| 2017/0075719 A1 * | 3/2017 | Scallan ............... H04L 41/5051 |
| 2017/0207988 A1 * | 7/2017 | Li .......................... H04L 47/24 |
| 2018/0053401 A1 * | 2/2018 | Martin ................ G08B 29/188 |
| 2018/0324093 A1 * | 11/2018 | Namjoshi .......... H04L 41/0866 |

* cited by examiner

CUSTOMIZED CALL MODEL GENERATION AND ANALYTICS USING A HIGH-LEVEL PROGRAMMING INTERFACE

OVERVIEW

Aspects of various embodiments are directed to communication and computing services. Data communications platforms have allowed individuals to transmit communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computing servers are increasingly being used to provide various data communications services over a network including, but not limited to, routing of Voice over Internet Protocol (VoIP) calls and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services.

The use of data communications services has been widespread and significant in terms of both numbers of users and types of services being made available. This growth may be attributable to any of a wide variety of socio-economic changes such as the mobility of users of these services, the types and reduced costs of portable communication tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a data communications service provider can be providing such data communications services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for customized communication model generation and analytics using a high-level programming interface.

Embodiments are directed toward methods for use in communications systems employing a data communications server operated by a data communications provider, where the data communications server is on the data communications provider side to provide data communications services to a multitude of client entities. In such contexts, the data communications server may be referred to as a data communications provider server. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communication-control engine to provide such communications services by receiving data communications from data communications endpoint devices, and identifying client-specific sets of control data (e.g., providing directives or commands with communication processing data, derived from programming instructions) written in a first instruction-configurable/programmable language that is associated with a message exchange protocol that is used between the data communications routing server and data sources. Examples of such client-specific sets of control data may include other forms of code providing data and/or instructions over an interface facilitating communication between the communications provider and the data communications endpoint devices. Such methods execute the client-specific sets of control data to make decisions on how to route communications placed by the data communications endpoint devices, and to identify a set of instructions (written in a second instruction-configurable/programmable language) associated with the routing decisions.

The first and second programmable languages may be similar, in that both languages are derivatives of a same type of programmable language, but the first and second programmable languages may differ in terms of content and use. The first programmable language may identify communication processing directives provided to the communications provider by the client entity, whereas the second programmable language may identify communication routing directives as provided by the communications provider. Such methods execute the set of instructions to retrieve data from the data sources maintained by the communications provider, and provide, in response to the data, communication control functionality for the data communications placed by the endpoint device. The first and second programming languages are related languages, whether indirectly or directly related via at least one level of translation. For example, or analogous to, C++, compiled to assembly/object level code and a converted to higher-level, different language or set of instructions.

Certain embodiments are directed toward an apparatus for communications over one or more wide-band networks. The apparatus may comprise a computing server comprising one or more computer processor circuits coupled to memory circuits and configured to interface with a plurality of remotely-situated client entities. The computing server is configured and arranged to provide a database with a set of virtual office features including client-specific communication routing functions, available to remotely-situated client entities based on a subscription. Moreover, the computing server is configured and arranged to interface with the client entities using the first programming language. The computing server is further configured and arranged to provide to the client entities, a set of instructions written in a first programming language that is associated with a message exchange protocol between a data communications provider server and data sources. The set of instructions include aspects of the message exchange protocol to be populated with client-specific directives associated with virtual office features available to the client entities. The client-specific sets of control data may be generated by the client entity by populating the set of instructions (received from the data communications provider server) with the client-specific directives.

The apparatus may also include a processing circuit communicatively coupled to the computing server and configured and arranged to receive the communication event data from the computing server, and receive from each of the plurality of disparate client entities, programming instructions over the message exchange protocol, the programming instructions corresponding to a second programming language that is compatible with the first programming language. For each of the plurality of disparate client entities, the processing circuit may accumulate data from the communication event data for one or more data metrics specified in a respective set of client-specific control data derived from the programming instructions. In such a manner, the processing circuit may evaluate the accumulated data for one or more parameters of interest specified in the respective client-specific control data.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
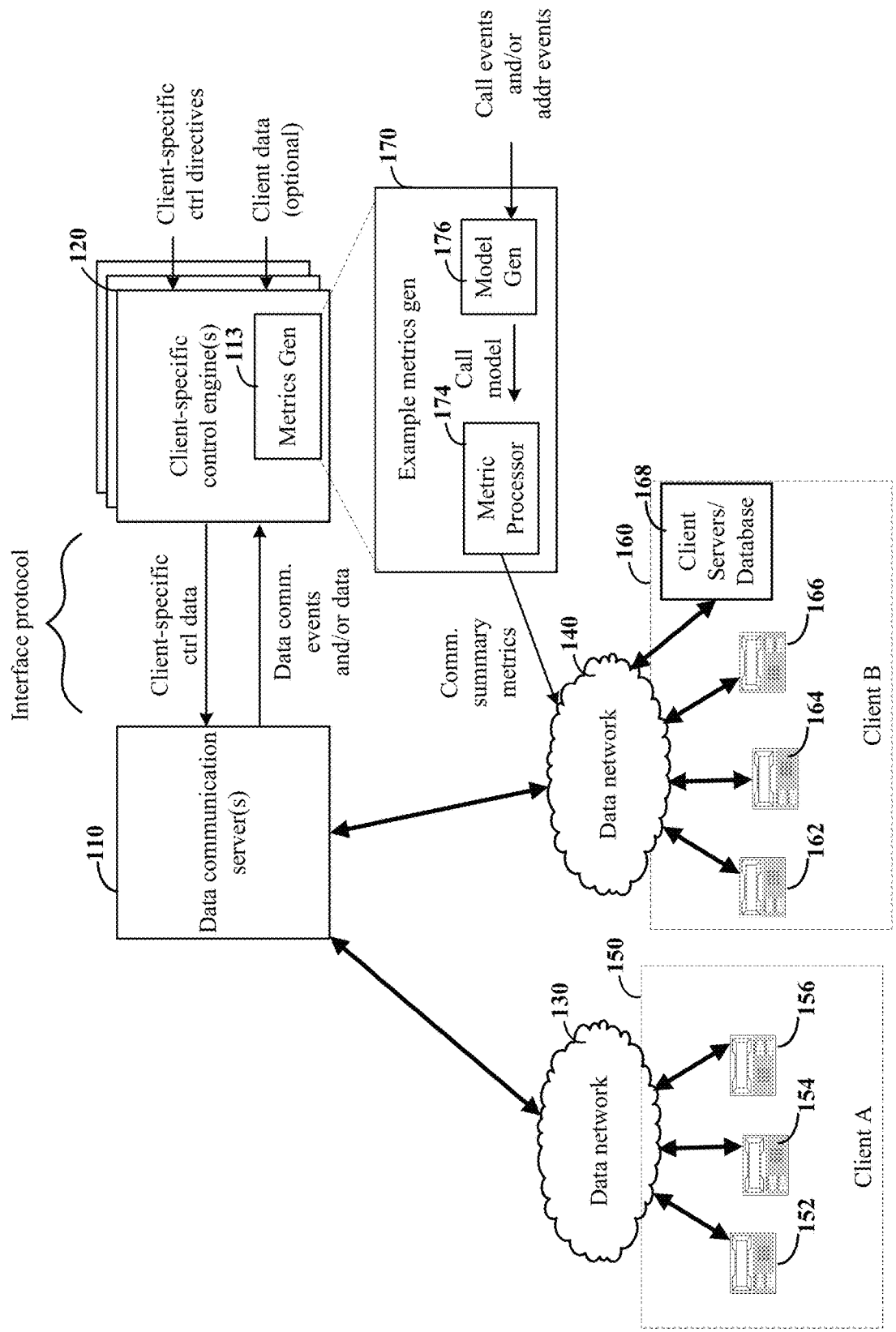
FIG. 1 is a diagram for customized communication model generation and analytics using a high-level programming interface, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving customized communication model generation and analytics using a high-level programming interface. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Aspects of the present disclosure relate to an apparatus that is configured to, for at least one identified organization, aggregate communication summary metrics of the participants associated with the organization to produce an aggregate set of data. In various implementations, the apparatus may aggregate communication summary metrics for communications occurring over various time periods including, for example, second, minutes, hours, days, weeks, months, or years. The apparatus identifies, based on the aggregate set of data, needs of the organization that can be satisfied by a set of capabilities (such as virtual office features) of a client entity.

In some implementations, the capabilities of the client entity may be manually defined by an authorized user (e.g., via a graphical user interface). For instance, a sales manager may manually add new product features to the set of capabilities. Additionally or alternatively, capabilities of the client entity may be automatically determined based on the communication summary metrics. For instance, the apparatus may be configured to determine capabilities for an identified organization based on the communication data metrics for communication participants associated with the organization. As an illustrative example, an organization may provide a service with limited bandwidth. The capability of the organization to provide the service for additional customers may be estimated based on a comparison of an average number of recent communications to recorded minimum and maximum numbers of communications processed by the organization. As another example, headers and other data communicated with data communications packets routed to end-users of an organization may indicate services provided by the organization. For instance, data communications data packets communicated to agents in a communication center that include video data may indicate that the communication center provides video-based customer service.

Identifying needs of associated organizations may be useful, for example, to identify potential customers for services or processes or to identify potential features for future products or services. For instance, an organization may have a need for security monitoring tools if analysis of communication summary metrics indicates occurrence of a high number of fraudulent communications in an IPBX operated by an organization. As another example, the identification of needs may be useful for evaluating quality of service provided to existing customers. For example, unanswered or dropped communications in a virtual communication center provided to a customer, may indicate a need to allocate additional communication center resources to the customer. As another example, upward trends in use of a bandwidth limited service by an organization may indicate a need for a higher-bandwidth service subscription.

Moreover, consistent with aspects of the present disclosure, the apparatus may be configured and arranged to receive communication event messages corresponding to a plurality of end-users from the IPBX and generate communication models from the communication event messages. A communication model includes data indicative of communication participants and/or events of a respective communication routed by the IPBX server. Various communications links may be established between end-user participants in the duration of a communication as the communication is transferred, parked, forwarded, or merged with another communication in a conference, for example. For ease of reference, a communications link may be referred to as a link.

In some embodiments, a communication model includes a respective record for each link between end-users involved in the duration of a communication. The record may indicate, for example, end-users or devices served by the link, communication events corresponding to the link, times of the communication events, performance of the link (e.g., throughput, packet loss, and/or latency), or various combinations thereof.

The apparatus may generate communication summary metrics from the communication models. Communication summary metrics may indicate various statistics characterizing the communication such as total communication time, caller on hold time, ring time, number of transfers, number of communication participants, etc. Additionally or alternatively, communication summary metrics may indicate various statistics indicative of participation of end-users in the communication. Statistics indicative of participation of end-users may include, for example, time the end-user was on the communication, time the end-user had the communication on hold, time for the end-user to answer the communication, whether or not the end-user transferred the communication, whether the communication was abandoned, and/or performance outcome (e.g., sales results or customer survey ratings).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communications services for endpoints of a plurality of different client accounts. It is understood that the various examples may be adapted for use with computer servers configured to provide various remote services, including, but not limited to: website hosting, remote data storage, remote computing services, virtual computing environments, enterprise communications, virtual contact center, and other services.

Some remote service providers customize their services for different customers. This might include customizable auto attendants, communication routing, communication forwarding, voicemail, monitoring, alerts, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided for the users of a client account during operation, while maintaining the integrity and security of the underlying system for providing the remote services.

According to certain embodiments, a data communications system may be configured to allow a client-specific control engine to dynamically modify and control the communication flow and processing at different levels within the system, including (re)routing of incoming communications generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the data communications provider. In various embodiments, the building blocks or particular configurations and the data communications servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming communications, whether to one or more receptionists, directly to extensions, to voicemail, or for other communication routing purposes. The logic used for the routing decisions can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communication system, particularly in situations where there are many thousands of extension rules can be a difficult proposition.

According to certain embodiments, the data communications system provides inbound and outbound communication routing for one or more PBXs. A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a data communications system is configured as a Platform as a Service (PaaS) that provides a user with access to, among other things, communication routing control, PBX functions, computer telephony integration (CTI), and data analytics (in this context the user can refer to, e.g., person, group, server or CPU, or subscribing business entity). Embodiments of the present disclosure are directed toward an interface that allows users of the data communications system solution to access data communications capabilities of the underlying system, including its hardware and software components, while maintaining the integrity and security of the underlying system. Particular embodiments are directed toward a communications solution that allows for customization of various virtual office features for end-users of the data communications system. The virtual office features may be adjusted for such end users, while also providing the ability to interface with data sources that are either part of the underlying system or external to the communications solution. These features can be used in combination with a communication routing system that can be configured and adjusted in a scalable manner. As end-users can customize the various virtual office features provided, so too can one or more parameters of interest specified in the respective client-specific control data be evaluated. The apparatus may generate communication models from the event data, and generate communication summary metrics from the communication models and based on the parameters of interest specified in the respective client-specific control data. In such a manner, an analysis of data communications data for one client entity may be used to analyze data communications data from multiple clients without exposing private data and/or the underlying code on the data communications provider side. For instance, a communication control engine may implement customized communication control for a client by utilizing data metrics gathered by data communications of another client entity.

The communication models may be generated in a number of ways. Each disparate client entity may have different metric subscriptions, which define the various aspects of the virtual office features to be monitored. For instance, client entities may have a subscription that monitors how often communications are dropped, a different subscription that monitors latency in accessing remote virtual desktops, and yet a different subscription that monitors processing speeds for servers providing the virtual office features, among other examples. The monitoring subscriptions available to client entities may be dynamic, in that the subscriptions are adjusted based on various inputs. For instance, rules of varying complexity (specified in the programming instructions provided by a client entity) may specify how monitoring subscriptions are altered. The monitoring subscriptions may be adjusted based on machine learning, such that monitoring services are added and/or removed based on actual usage. Additionally or alternatively, the monitoring subscriptions may be adjusted based on client specific thresholds and/or based on monitoring subscriptions frequently requested by other client entities. Regardless of the manner in which monitoring subscriptions are updated, subscriptions may be adjusted in a customized manner for each client entity without exposing the backend algorithms used by the data communications service provider.

The ability to access the underlying data communications services, including communication routing and communication control engines, can provide a platform that is both flexible and simple to implement from the viewpoints of both the data communications provider and the customers of the data communications provider. The communications solution can be configured to modify the virtual office features available to different end-users, and to control the communication flow and processing at all levels within the system, including (re)routing of incoming communications to different PBXs. When compared to an add-on type service where a communication is first handled by a separate PBX, the communications solution may offer a number of advantages and additional features including, but not limited to, increased communication routing capabilities, scalability, and reduced complexity. For instance, access to PBX functions allows for simple communication redirection to extensions or DID numbers provided by the PBX. Moreover, the communications solution coordinates and routes communications between multiple PBXs using an initial communication routing switch. Communications initially routed to a particular PBX can still be rerouted to a different PBX using the initial communication routing switch. Yet further, the communications solution allows a data communications client having multiple end-users to customize the various virtual office features provided to the end-users, without compromising the security of the underlying system or requiring additional customization by the data communications provider.

The data communications servers providing the underlying function for the data communications system can be configured to utilize a programmable (or configurable) communication protocol such as a high-level, domain-specific programming language as might be implemented with respective data communications servers providing data communications routing and IP PBX functions on respective sides of an interface configured to facilitate the communications via the defined protocol. A particular example of a data communications server may use session initiation protocol (SIP) to handle various communication functions (e.g., communication setup and tear down). However, the various embodiments discussed herein are not necessarily limited thereto. Consistent with the above and in other embodiments disclosed herein, the data communications servers can be configured to establish a portion of the communication from the data communications endpoint devices to another data communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial communication routing and the other for providing more complex and specific communication processing functions. More particular example embodiments use an eXtensible Markup Language (XML). An XML model defines the constraints on the high-level language, including defining the set of valid commands that can be carried out by the data communications servers. Within these constraints, a customer can write XML code that self-describes the building blocks or particular configurations used in the customer's particular application. For instance, a common set of instructions, written in the high-level language (e.g., an XML, language) may be provided by a data communications provider to client entities. The common set of instructions may form a template to be populated with client-specific directives, the populated template forming programming instructions that instruct the data communications provider how a particular client entity is to be configured for various data communications services. The data communications provider may derive client-specific sets of control data from the programming instructions, and store the client-specific sets of control data for subsequent retrieval and implementation. In such a manner, the data communications provider may provide a lightweight and simplified set of instructions to client entities, and client entities may provide the data communications provider with instructions to customize the virtual office services for that particular client entity. XML also allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in the Appendix as attached to the underlying U.S. Provisional Patent document (Application No. 62/524, 002 filed Jun. 23, 2017) incorporated herein by reference. In certain example data communications applications, two XML-type languages are implemented as a communication processing XML and a communication routing XML, respectively as XML derivative languages corresponding to XML but customized for processing data communications on the side of the interface operating on behalf of customer entities and on the other side of the interface for higher level processing (including, for example, communication routing) by the data communications service provider. Such XML derivative languages can be written specific to types of functionality as needed for various customer entities, thereby allowing developers to program communication processing logic or service execution logic with both XML building blocks and JavaScript/TCL, or other scripting languages best suited to levels (e.g., in terms of quantity range) of a customer's endpoint devices and/or in terms of complexity of the data communications-based media functionality and evolving demands expected by a customer. In certain implementations, XML derivative languages allow data communications customer developers to program and integrate data communications flow (e.g., as provided by a cloud-based data communications service) with customer or third party application servers and databases. In particular, the communication flow can include a connection that is used as part of communication routing decisions and communication processing options that are related to one or more receptionists that can answer communications to a group of endpoint devices. The system allows different levels of communication control logic to be implemented in a manner that can facilitate scalability of the system of large organizations with many endpoint devices and/or end-users and with complex organizational structures that have corresponding complex communication routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communication routing and another programming language can be used for providing more complex and specific communication processing functions.

According to particular embodiments, an XML engine can respond to a communication, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communication control, and flow control logic, among others. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications server provider's cloud database). This information can then be used to drive communication flow or communication control functionality and decisions.

As applicable to routing decisions relating to receptionists, an incoming communication can be processed according to an XML document with instructions (e.g., client-specific sets of control data) for determining whether communications route to a receptionist, directly to a called endpoint device, or are routed and processed in some other manner. As an example, the XML document could include a set of global rules for determining how to handle communications to endpoints of a customer (e.g., a large business with many individuals and corresponding endpoint devices). XML documents can also specify local rules for routing communications (e.g., to endpoint devices, voicemail, auto call attendants), or otherwise processing the communication. The local rules might be used if global rules specify that the communication is not routed to a receptionist, or if the receptionist rejects or forwards the communication on. Each of the local and global rules can be driven, at least in part, by data retrieved from a data source, such as a client server or database. As an example, the global rules could access a customer database that includes lists of caller IDs that are handled differently. The communication routing data communications server does not need to have direct access to the lists of caller IDs (which might be confidential lists and thereby represent a security risk if shared directly with the data communications server). Rather, the data communications server can send a query that includes a specific caller ID number of an incoming communication. In response to the query, information can be provided that indicates how to process the communication (e.g., whether to route the incoming communication to a receptionist or directly to the dialed endpoint device).

According to various embodiments, the high-level programming language allows a programmer access to the communications solution by way of a controlled and limited set of communication control functionality in the form of communication processing and routing operations. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control of, or access to, the inner workings of the data communications servers. In a similar manner, in various embodiments, the data communications customer can update or make changes to the various virtual office features that are provided to end-users to provide a customizable solution for each data communications customer and their respective end-users.

In various embodiments, the high-level programming language and the data communications servers that execute the high-level programming language can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In example embodiments, a data communications provider server may be configured to provide customized virtual office features (e.g., data communications services) to clients of the data communications provider. The data communications provider server may include one or more computer processor circuits coupled to memory circuits and configured to interface with a plurality of remotely-situated client entities. The data communications provider server can be configured and arranged to provide a database with a set of virtual office features including client-specific communication routing functions. The set of virtual office features, including communication routing functions, may be available to remotely-situated client entities based on a subscription provided by the data communications provider. The data communications server can provide to the client entities, a set of instructions written in a first programming language that is associated with a message exchange protocol between the data communications provider server and data sources.

The set of instructions can include aspects and/or portions that are to be populated (e.g., supplemented) with client-specific directives associated with virtual office features available to client entities. For example, the data communications provider server can provide to each client entity, a common set of instructions defining various aspects of virtual office features provided to the client entities. This set of instructions may serve as a sort of template, or default configuration, of virtual office features provided to the client entities. In turn, the client entities may provide to the data communications provider server, programming instructions from which client-specific sets of control data are derived, which allow the data communications provider server to customize the virtual office features provided to each particular client entity. The programming instructions can be written in a second programming language that is compatible with the first programming language (e.g., the language in which the set of instructions from the data communications provider are written in). Moreover, the programming instructions can be generated by the client entity (by a client-specific control engine) by populating or combining the set of instructions received from the data communications provider server with a set of directives associated with the virtual office features available to the client entity. The client-specific sets of control data, derived from the programming instructions and stored for subsequent retrieval and implementation by the data communications provider, can be used to provide an adjusted set of features to end-users of the client entities (e.g., based on and according to the client-specific sets of control data)

The adjusted set of virtual office features may be a subset of the virtual office features to which the client entity has subscribed. For example, a client entity such as a fitness company may subscribe to a particular set of communications services hosted by the data communications server. The client entity may have a number of franchises located in different geographic regions, and each franchise location may have different needs for communications services. As such, the client entity may wish to provide different types and/or different configurations of data communications services for its different franchise locations. In such a manner, the data communications server may provide an adjusted set of features to end-users of the client entities according to client-specific sets of control data. In another non-limiting example, the client entity may utilize a number of PBXs or IPBXs, and may segment the various end-users among the different PBXs, such that incoming communications are routed to one of the many PBXs associated with the client entity.

The client-specific sets of control data, associated with each respective client entity, may define aspects of the set of adjusted virtual office features provided to that particular client entity. As described herein, the programming instructions received by the data communications provider server from the client server may be written in a programming language that is associated with a message exchange protocol between the data communications provider server and data sources. For instance, the programming instructions, written in the programming language, may specify a manner in which communication event messages corresponding to a plurality of end-users are received from the data communications provider server, and a manner for generating communication models from the communication event messages.

The programming instructions provided by the client entity may define various aspects of the virtual office features provided to end-users of the client entity. For instance, the programming instructions may define handling procedures of phone communications and/or conference communications for end-users of the client entity. The programming instructions may define a manner in which phone communications to and/or from the end-users are routed upon receipt. Similarly, the programming instructions may define a communication queue process for communications placed to the end-users, and/or designate an automated communication attendant to route data communications placed to the end-users. For example, a data communications client may instruct a data communications provider to configure the client to queue incoming communications, to assign incoming communications to one or a plurality of communication queues purchased according to a subscription, and to limit a number of communications to be placed in each of the communication queues. The data communications client may also instruct the data communications provider server to configure the client entity to create subgroups of end-users, such that incoming communications may be routed to a particular subgroup of end-users. Parameters of interest may be monitored by the client entity in a specified manner. For instance, the client entity may specify aspects of the virtual office features to be monitored.

The programming instructions may also define system integration processes. Each client entity may utilize a number of network applications to support daily operations. For instance, the client entity may utilize an email application, an appointment scheduling application, and/or a messaging application, among other examples. The adjusted virtual office features provided to the end-users by the data communications server may be configured to define a manner in which the adjusted virtual office features operate in collaboration with the different network applications of the client entity. For example, the virtual office features provided by the data communications server may collaborate with the clients' email application, allowing end users to communicate with contacts from their email application using the virtual office features. Similarly, the virtual office features may be customized for the client entity such that the adjusted virtual office features provide notifications to end-users when messages, correspondence or other forms of communications are received via network applications of the client entity. Such notifications may be indicative of operations of the network applications of the client entity. For instance, the adjusted virtual office features provided by the data communications server may allow an end-user to receive a notification when a communication is received from a contact on a social media site, and/or to retrieve information for a particular customer from a customer relationship management (CRM) application when a communication is received from the particular customer.

The client-specific sets of control data, as derived from the programming instructions provided by a client server on behalf of a client entity, may define aspects of analytics solutions available to the client entity and/or end-users of the client entity. For example, a particular client entity may desire to obtain (from the data communications server) detailed monitoring reports on communication activity of its respective end-users, including numbers of active communications, abandoned communications, talk time, ring time, and detailed communication records, among other examples. The client entity may further wish to obtain (from the data communications server) real-time monitoring information on communication clarity and quality issues for each of its respective end-users. As such, the client-specific sets of control data may define for the data communications server, various data points to be collected that indicate performance of the set of adjusted virtual office features provided to the end-users. Such monitoring solutions allow the client entity to evaluate system performance metrics measured by the data communications provider, on behalf of the client entity.

In various embodiments, a data communications client server may be provided, comprising one or more computer processor circuits coupled to memory circuits and configured to interface with the data communications provider server. As described herein, the data communications provider server can be configured to provide a database of virtual office features available based on a subscription. Similarly, the data communications client server can receive from the data communications provider server, a set of instructions written in a first programming language that defines a message exchange protocol between the data communications provider server and data sources. The data communications client server can further generate client-specific sets of control data written in a second programming language that is a subset of the first programming language. The second programming language may be considered a subset of the first programming language, and is associated with virtual office features available to the client entity. For instance, the client-specific sets of control data, provided in the second programming language, may further define and/or adjust the virtual office features provided to a client entity and/or end-users of the client entity.

The data communications client server can transmit to the data communications provider server, programming instructions written in the programming language such that the adjusted virtual office features may be configured. The data communications client server can access the set of adjusted virtual office features provided by the data communications provider server. In some instances, the client entity can allow the data communications provider to indirectly access data sources of the client entity. For example, the client entity can specify a URI that points to the data communications client server and specifies an associated query. The data communications client server can execute, for example, a local script that may rely upon customer data. The script can generate a response in the particular programming language, and the data communications provider server can then carry out communication routing, or other communication control functions, based upon the response and without ever having direct access to the customer data. As such, the data communications client server can be configured to provide programming instructions from which client-specific control data are derived, where the client-specific control data instructs the data communications provider server to retrieve data from the data sources based on the accessed set of adjusted virtual office features. The data communications client server may provide, in response to the retrieved data, communication control functionality to end-users of the client entity based on the accessed set of adjusted virtual office features.

Consistent with various embodiments of the present disclosure, programming instructions provided by the data communications client server to the data communications provider server may define various aspects of the virtual office features provided to client entities and/or end-users of client entities. For instance, a client entity may wish to provide different virtual office features to different subgroups of end-users, and/or to configure different virtual office features differently for different subgroups of end-users. For instance, the client entity may wish to monitor different aspects of virtual office features for different groups and/or subgroups of end-users. Such subgroups may differentiate business units of end-users that have different needs for virtual office features compared to other business units. As such, client-specific sets of control data may define a plurality of end-user subgroups of the client entity, and the data communications client server may be configured to provide access to the set of adjusted virtual office features according to permissions of the end-user subgroups. Similarly, the programming instructions may define a plurality of data subscriptions to be included in the set of adjusted virtual office features, and the data communications client server may be configured to access the plurality of data subscriptions using the data communications provider server.

Programming instructions may be generated by a client server responsive and according to client-specific directives. Consistent with the above-characterized embodiments, at the client side of the data communications services, the client's computer-based processing resource (e.g., by the client-specific control engine) generates and submits programming instructions for assessment and use by the data communications service provider. Client-specific control data may be derived from the programming instructions and stored for subsequent retrieval and implementation by the data communications service provider. In a typical implementation, these programming instructions can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the client-specific sets of control data (submitted from the client side) for adjusting the data communications services being provided to the submitting client.

By using a common interface protocol (e.g., the programming language, codes or command sets) which is understood by the data communications service provider, authentication and updating for added services is readily achieved automatically and remotely without burdening the data communications service provider with cost-intensive set up procedures. Depending on the level of services being added/changed for each client, and/or depending on the client's manual-operator and/or automated technology, the programming instructions can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, data communication events or data received from the data communications server, client-specific directives received in the form of user input (e.g., input via dial-tones and/or GUI), data acquired from a client (e.g., from a client database), and/or data provided by third parties (e.g., third party monitoring services).

To provide a simplified, yet customizable solution that protects the security of the underlying data communications system and client entity data, the set of adjusted virtual office features may be provided to the end-users of the particular client entity in a programming language that includes communication flow commands for communication routing logic (such as an XML language, XML-derivative language, or other language described herein). Moreover, the virtual office features may be dynamically adjusted to account for changing needs of the client entity. As such, the set of adjusted virtual office features may be revised via the data communications server, responsive and according to additional sets of client-specific control data received from the particular client entity. For instance, the set of adjusted virtual office features may be revised via the data communications server responsive and according to instructions configuring customized alerts for the particular client entity. Such customized alerts can define a manner in which notifications, alerts, and/or specified types of messages are provided to end-users of the client entity.

Turning now to the figures, FIG. 1 is a diagram for customized communication model generation and analytics using a high-level programming interface, consistent with embodiments of the present disclosure. The system includes a computing server 110 configured to provide data communications for a plurality of endpoint devices 152, 154, 156, 162, 164, and 166 connected in one or more data networks 130 and 140. The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data communications servers 110. In this example, endpoint devices 152, 154, and 156 are associated within an account 150 for a first client A and endpoint devices 162, 164, and 166 are associated within an account 160 for a second client B.

The system includes one or more processing circuits configured to implement client-specific control engines 120, which are configured to adjust the data communications provided for each client account according to a respective set of control directives. For instance, the client-specific control engines 120 may adjust routing of a data communication for a client account by providing programming instructions (from which client-specific sets of control data are derived) to the data communications server 110. For example, the client-specific control engines 120 may generate client-specific sets of control data by processing the respective set of control directives for the account in response to data communications event data or other data prompts received from the data communication server(s) 110. For instance, the control directives for a client account may be configured to adjust routing of a particular data communication in response to communication event data indicating a new incoming communication to an endpoint of the client account.

The control directives for a client account may generate the programming instructions based on various data metrics including, for example, data communications events or data received from the data communication server, user input (e.g., input via dial-tones and/or GUI), data acquired from a client (e.g., from a client database), and/or data provided by third parties (e.g., third party monitoring services). The client-specific control engines 120 communicate the client-specific control data to the data communication server(s) using an interface protocol having an instruction format that is independent of an instruction format used to implement the client-specific control engines 120 and/or client-specific control directives. The independent instruction format of the interface protocol allows clients to write programming instructions including complex logic and various data sources, for example, using various different high-level languages without regard to the particular language used to implement or communicate with the data communications provider server. In some embodiments, the instruction set of the interface protocol may be configured to limit customer control over certain data communications settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the data communications server(s) 110. Additionally or alternatively, one or more client-specific control engine(s) 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of virtual office features including, for example, data communication services such as VoIP calls, audio and/or video conferencing, IPBX exchange servers, packet switching, and traffic management as well as non-VoIP services including, but not limited to, website hosting, remote data storage, remote computing services, virtual computing environments. One or more of such virtual office features may be provided, for example, by a cloud computing network having one or more servers configurable to provide a data communications system for a plurality of clients.

As previously indicated, communication event messages may be provided to various end-users and/or applications in addition to end-users who are participants in a communication. For instance, in some implementations, an authorized user or application may initiate a subscription to monitor communication events for specified end-users. In response to receiving a subscription request, the client-specific control engines 120 initiate a new subscription for the user or application. While the subscription is active, the data communication server(s) 110 provides event messages to the subscriber to indicate changes in statuses of the communications for the end-users specified in the subscription.

A client-specific control engine 120 is configured to receive the communication event messages generated by the data communications server 110 for communications to or from the end-users. The client-specific control engine 120 includes a metrics generation circuit 113 configured to generate communication summary metrics from the communication event messages received from the data communication server 110. Circuit 170 shows an example implementation of the metric generator circuit 113. In this example, the circuit 170 includes a model generation circuit 176 configured to generate communication models from the communication event messages. A communication model may include records describing, for example, participants of a communication, connections between the participants, and/or events of the communication. The example circuit 170 may also include a metric processor circuit 174 configured to generate communication summary metrics from the communication models. The communication summary metrics for a communication indicate various statistics characterizing the communication and/or end-user participation in the communication.

The client-specific control engine 120 may utilize various processes to generate communication summary metrics and/or other data metrics from received data. The client-specific control engine 120 may also include an analysis circuit (not illustrated in FIG. 1) configured to perform various analytical processes using the communication summary metrics and/or other data metrics. In some embodiments, the client-specific control engine 120 (via the analysis circuit) is configured to identify organizations associated with communication participants and analyze communication summary metrics for communications of the organizations to identify needs of the organization. For at least one of the identified organizations, the analysis circuit aggregates communication summary metrics and/or other data metrics of the participants associated with the organization to produce an aggregate set of data. Based on the aggregate set of data, the analysis circuit identifies needs of the organization that can be satisfied by a set of capabilities. As previously indicated, the set of capabilities may include, for example, features of a set of available products and/or services offered by various parties (e.g., an identified organization or data communications service provider configured to host IPBXs for one or more of the identified organizations). As previously described, capabilities in the set may be manually defined by an authorized user (e.g., a sales manager of an organization) or may be automatically determined by the analysis circuit based on the communication summary metrics and/or other data metrics.

In different embodiments, the client-specific control engine 120 (via the analysis circuit) may use various processes to identify needs of an organization. In some implementations, the analysis circuit identifies a need of an organization based on a comparison of communication summary metrics (and/or other data metrics) for the organization to a respective signature for the need. The signature may identify a presence or absence of a need as a function of values of one of more communication summary metrics, which alone or in combination are indicative of the need. The analysis circuit may determine whether an organization has the need by evaluating the function using the communication summary metrics for communications of users associated with the organization. In some implementations, a signature may identify a need as a function of various data metrics in addition to or in lieu of the communication summary metrics. For instance, additional data metrics may be gathered from various data sources including, for example, applications utilized by the end-users in the network, internet-connected data repositories, and/or third-party data subscription services.

A client-specific control engine 120 is configured to receive the communication event messages generated by the data communications server 110 for communications to or from the end-users. The client-specific control engine 120 includes a model generation circuit 176 configured to generate communication models from the communication event messages. As previously described, the communication model may include records describing communication links, participants, and/or events of each communication. The communication data processing circuit also includes a metric processor circuit 174 configured to generate communication summary metrics from the communication models. As previously described, the communication summary metrics may indicate various statistics characterizing each communication and/or end-user participation in the communication. The communication summary metrics may be provided to the client entities (160 and/or 150, as the case may be) via the data networks 140 and/or 130.

Figure 2:
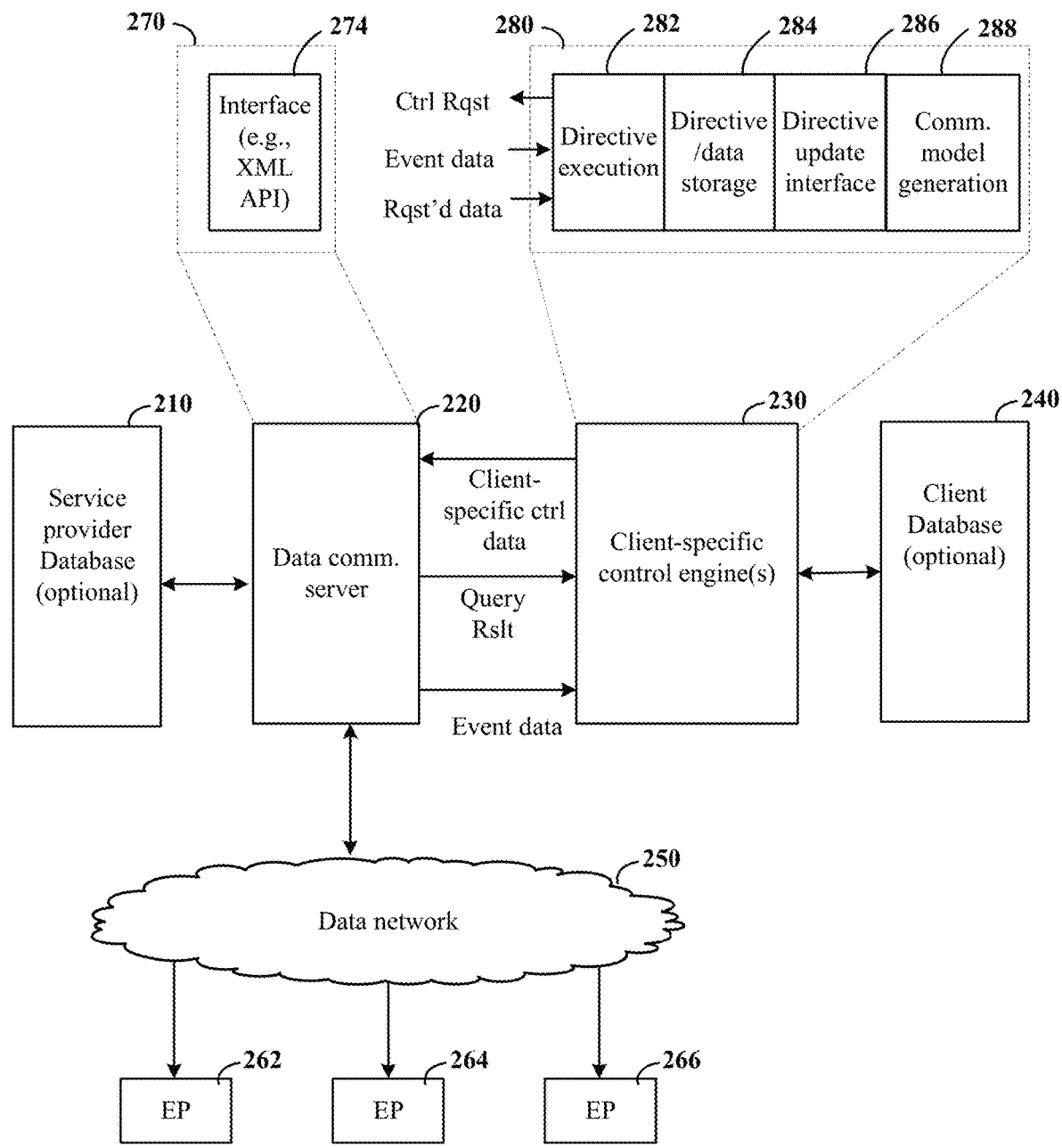
FIG. 2 is a block diagram of a communication control engine with high-level programmable language logic for two different languages, consistent with embodiments of the present disclosure.

FIG. 2 is a block diagram of a communication control engine with high-level programmable language logic for two different languages, consistent with embodiments of the present disclosure. The system includes a data communications provider server 220 configurable to provide one or more virtual office features for a plurality of endpoint devices 262, 264, and 266 connected in a data network 250. The endpoint devices may include VoIP-enabled devices (e.g., IP phones, smart phones, tables, and/or desktop computers) and/or non-VoIP endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the virtual office features (e.g., data communications) provided for each client account according to a respective set of control directives. For instance, the client-specific control engines 230 may dynamically adjust a manner in which performance of the virtual office features are monitored by the data communications server 220, based on the one or more sets of control directives specified for the client entity.

As described with reference to FIG. 1, the control directives for a client account may generate client-specific sets of control data based on various data metrics including for example, data communications events or data received from the data communication server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engine 230 to issue an analytics request specifying a particular evaluation of data in a database (e.g., 210 or 240). For example, client-specific control data communicated to the data communications provider server 220 may prompt the data communications provider server 220 to monitor particular data communications data for a client entity and/or to perform a particular analytical evaluation of data stored in the service provider database 210. After completing the requested monitoring and/or evaluation, the data communications provider server 220 communicates the result back to the requesting client-specific control engine 230. Data retrieved from the databases and/or via analytics evaluation may be used, for example, to dynamically adjust the virtual office features provided during operation.

The client-specific control engines 230 communicate the client-specific control data to the data communication server(s) using an interface protocol having an instruction format that is independent of an instruction format used to implement the client-specific control engines 230 and/or client-specific control directives.

As previously described, the independent instruction format of the interface protocol allows clients to write programming instructions, for example, using their preferred high-level programming and/or may be used to limit customer access and/or control over the data communications provider server. For example, the interface protocol may be configured to allow the client-specific control engines to request analysis of data in the service provider database 210 without allowing direct access to the raw data stored therein. Similarly, the client-specific control engines may be configured to request analysis of data in the client database 240, without allowing direct access to the raw data stored therein.

As described with reference to FIG. 1, client-specific control engines 230 may be implemented in various locations. For example, client-specific control engines 230 for a particular client account may be implemented in the data communications provider server(s) 220, in a separate processing circuit communicatively connected to the data communications provider server(s) 220, using one or more processing circuits of the client, or a combination thereof.

The data communications provider server 220 and client-specific control engines 230 may be implemented using various circuit arrangements. Block 270 shows an example implementation of a data communications provider server configured to provide a data communications service for a client. The example data communications provider server 270 includes one or more IPBX server(s) configured to establish and direct data communications for a plurality of endpoints of a customer account. Interface circuit 274 is configured to allow different client specific control engines to communicate with the data communications provider server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the data communications provider server 220, for example, via an interface, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

In this example, the client-specific control engine 230 includes a communication model generation circuit 288 configured to receive communication event messages from the data communications provider server 220. The communication event messages may be communicated, for example, as computer-telephony-integration (CTI) messages. The communication model generation circuit 288 generates communication models based on the communication event messages. The client-specific control engine 230 may also include a communication metric processor that generates communication summary metrics from the generated communication models.

Figure 3:
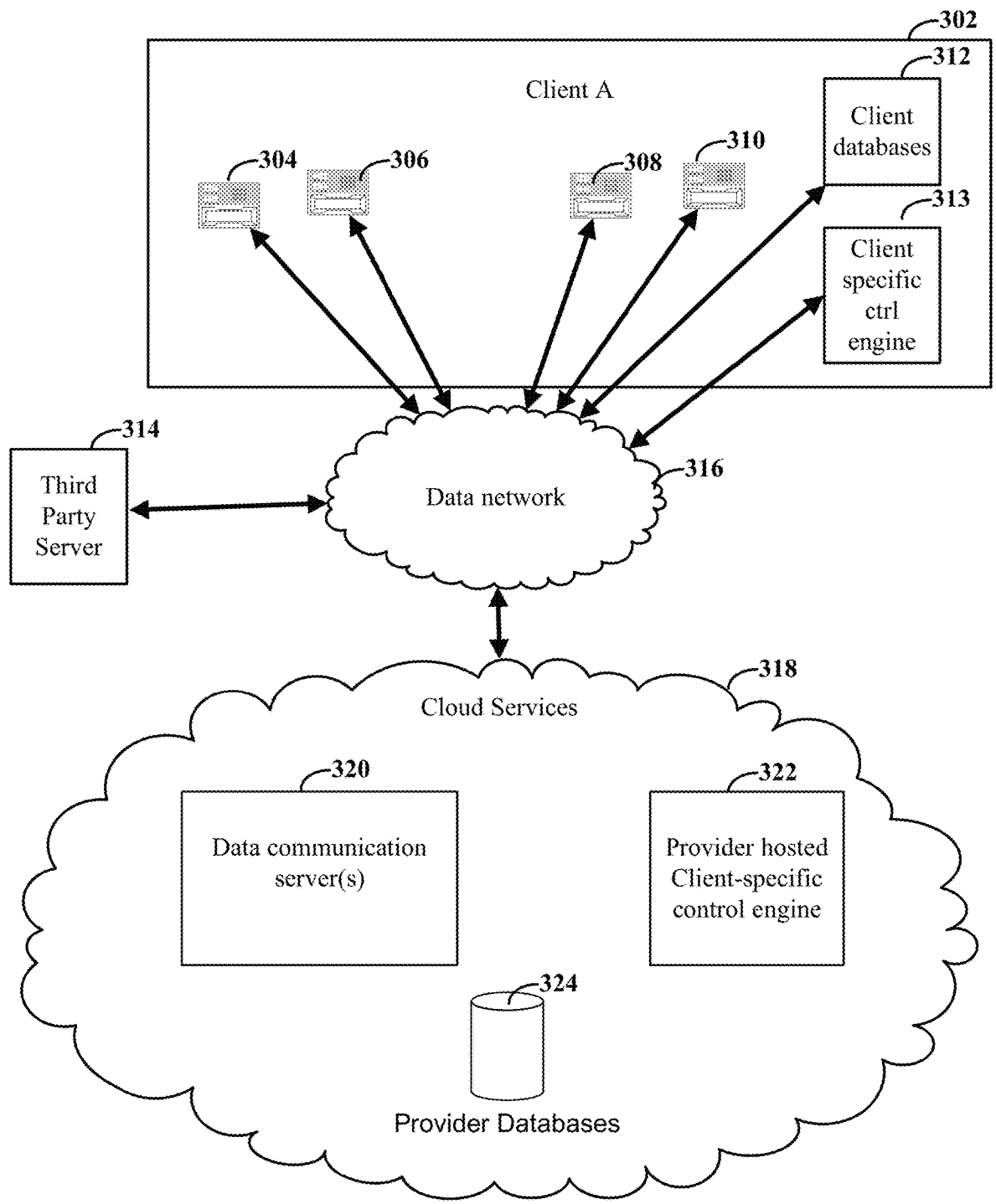
FIG. 3 is a diagram for a system that uses a high-level programming language for customized communication model generation and analytics, consistent with embodiments of the present disclosure.

FIG. 3 is a diagram for a system that uses a high-level programming language for customized communication model generation and analytics, consistent with embodiments of the present disclosure. In connection with these specifically-illustrated examples, data communications endpoint devices 304, 306, 308, and 310 connected in a data network 316 are configured to place and receive data communications between other data communications endpoint devices, and/or between non-data communications endpoint devices. Non-data communications endpoint devices may include, for example, plain old telephone service (POTS) telephones and cellular-capable devices, which might also be communications-enabled (e.g., smart phones with appropriate data communications software applications). The various endpoint devices include circuitry that is specially configured to provide communication functions that include interfacing with the appropriate circuitry of the communication service provider used by the corresponding endpoint device. In many contexts, a data communications endpoint device is a data communications-enabled telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications can be provided by one or more data communications servers 320 within a cloud services system 318 (e.g., configured to provide virtual office features to customers of the data communications provider). In particular example embodiments, the data communications servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud services system 318 where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including both the data communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

According to various embodiments, one or more data analytics servers can monitor and analyze communication data relating to the data communications servers and data communications endpoint devices. For example, a data analytics server can be designed to track communication statistics about various different communication-related parameters, such as communication duration, communication date, communication time of day, called parties, endpoint devices, selected data centers, selected carriers, dropped communications, transferred communications, voicemail access, conferencing features, and others. The high-level programming language(s) and the data communications servers executing the languages can access the communication summary metrics and the data analytics, which can be stored in a provider database 324. For example, a script running the data communications server could parse communication processing XML (CPXML) documents to generate database queries that direct the data communications server to query, or subscribe to, communication length summaries for all communications made to endpoints that are registered to the data communications server. The script could then use the information to control how communications are routed as well as how different (customer or provider) services are invoked. According to various embodiments, the database queries could be sent to a customer database 302.

Consistent with certain embodiments, the data communications server can be configured to interface with customer databases 312, or with third party servers 314. For instance, a CPXML document stored by the cloud services system 318 can identify, based upon a received communication, a Uniform Resource Identifier (URI) that points to customer databases 312, or to a third party server 314. Control directives provided from these servers, for example, in the form of a CPXML document can be used to specify communication routing, or other functions.

Figure 4:
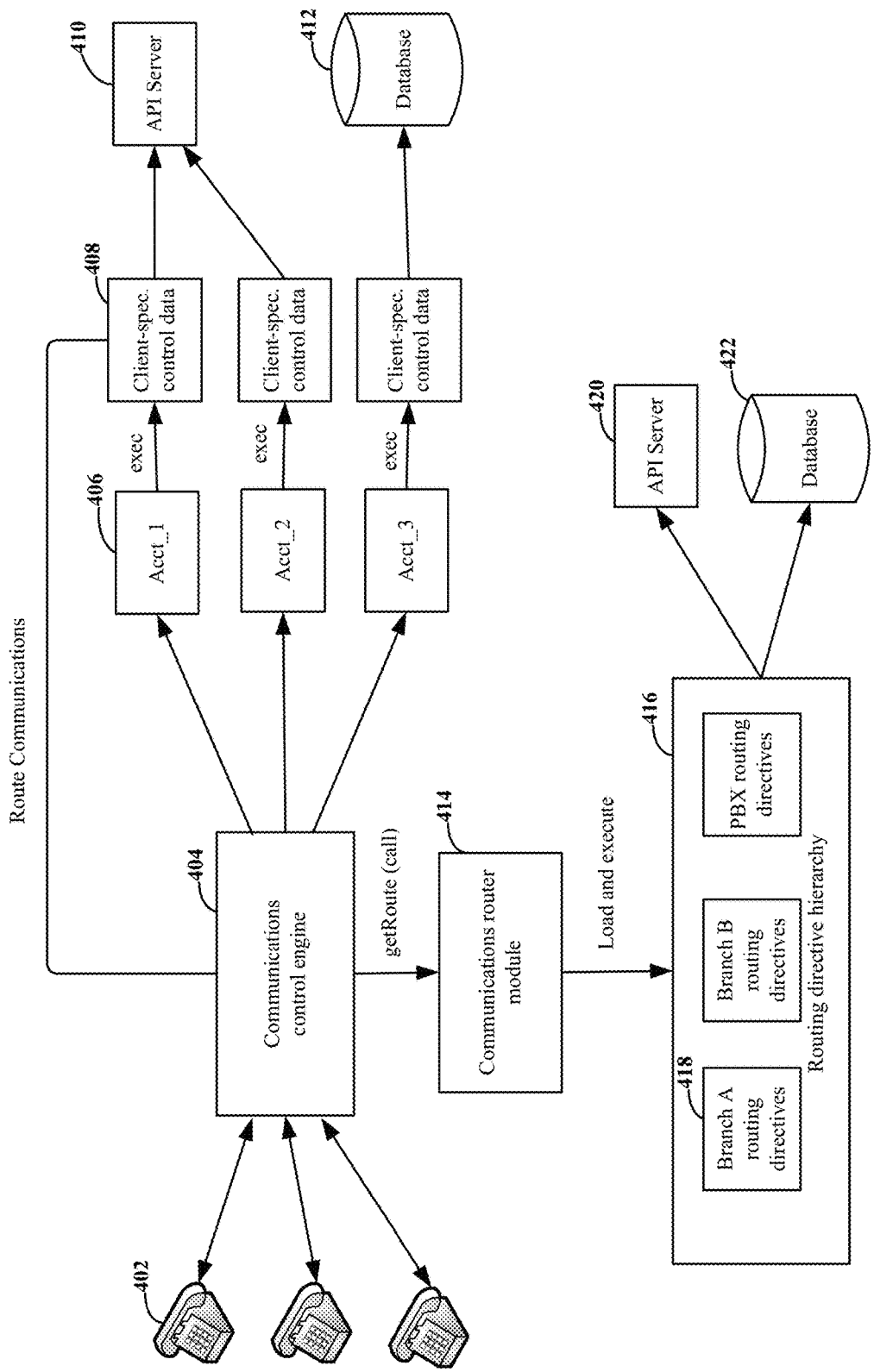
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Communication control engine 404 can provide communication flow control and routing in a manner that can be consistent with discussions found herein and relating to communication control engines, data communications servers, and the other figures. Consistent with various embodiments, the communication control engine 404 is a PBX that is part of a data communications system. For instance, the PBX can be configured using Java-based applications that manage data communications networks. The PBX can be hosted by a data communications service provider and located at one or more data centers. Various PBX features can be provided, such as communication forwarding, remote pickup, communication routing, and voice mail.

Consistent with various embodiments, customers of a data communications provider can use the data communications system by generating documents written in both CRXML and CPXML. Together, the documents specify how the customer would like communication intercept to be handled for both inbound and outbound communications. For instance, a CPXML document 408 can be associated with an extension account 406, or with groups of extension accounts. The extension accounts 406 can represent a specific individual and their associated extension number(s). A CPXML document 408 that is configured in this manner will be invoked by the communication control engine 404 after an incoming communication is routed to an extension that has CPXML capabilities enabled. CPXML documents can also be used for communication flow processing of outbound communications. The CPXML document may provide logic for sophisticated communication control functions for outbound communications. For example, messages (e.g. text messages and email messages) can be automatically generated in response to outgoing communications and restrictions can be placed on outbound communications based upon factors such as time of day or communication history.

The communication control engine 404 may also consult with communication routers 414. The communication routers can be programmed using CRXML documents 418, and with JavaScript for dynamic data access and logic handling. The CRXML documents 418 can be arranged in router xml hierarchy 416, which can specify different CRXML documents 418 depending upon the branch or PBX that is identified as corresponding to the communication. Once the communication router documents are loaded, they can be cached in memory and used by the communication control engine 404 to make a routing decision. When a communication is routed through the communication control engine 404, the communication control engine can consult with high-level CRXML documents. The branch level can be identified, for example, based on the branch Id of caller (for outbound communications) or callee (for inbound communications). Delineations other than the branch are also possible, such as by the called country, the particular store, the state, or other. If a route result is not determined, the communication control engine 404 can also consult with PBX-level CRXML document to obtain routing decisions.

The communication router module 414 can also interact with a CPXML document to handle sophisticated communication flow scenarios where the communication routing is changed after the initial determination. For example, the CPXML can include commands (e.g., "reroute") that the communication control engine 404 uses to provide feedback to the programmable communication routers 414, which use CRXML for initial routing decisions. This might allow, as an example, a CRXML routing decision to be overridden by the CPXML document(s).

According to particular embodiments, the programmable communication routers (using CRXML) 414 can be viewed as plugins to the communication control engine 404. The communication router plugins may have two levels—Branch and PBX levels. The communication router supports CRXML-defined structures that specify how the PaaS can be utilized by a customer. For example, the CRXML can define sets of conditional statements, data access requests, and communication routing commands: if/else, condition, goto, log, var, script, query, data, accept, reject, route statements, or other similar commands. In particular embodiments, CRXML can be considered a subset of CPXML by containing a part, but not all, of the CPXML communication flow commands. This distinction can be useful for keeping CRXML documents light weight so that communication routing decisions are simplified and efficient. More complex tasks, such as the use of media and advanced communication handling, can be handled using CPXML. Using such programmable communication routes, a few example uses include: school district that generates SMS/Email notifications to parents whenever an emergency number is dialed; off hour restriction of outbound communication with CPXML; communication center lockdown to provide outbound dialing restriction for phones; computer initiated dialing with caller identification (ID) override based destination database table, and communication return to target DID/agents; and implementation of a communication black list (denying communications to/from the list) or white list (allowing communications to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, communication route session data (caller id, callee id, or route from/to), query custom object (to a database) in the data communications provider system/cloud, and access data through HTTP RESTful API. For instance, the XML documents can include a web resource that is identified by Uniform Resource Identifiers. The web resource might be a customer HTTP server that responds to a conditional query (e.g., whether or not a communication queue is above a threshold) with CPXML code that instructs the communication control engine on how to route, or otherwise handle, the communication. In such a manner, client-specific sets of control data provided by the communication control engine may allow for adjusted (e.g., customized) virtual office features for end users (such as 402) of the data communications system.

Figure 5:
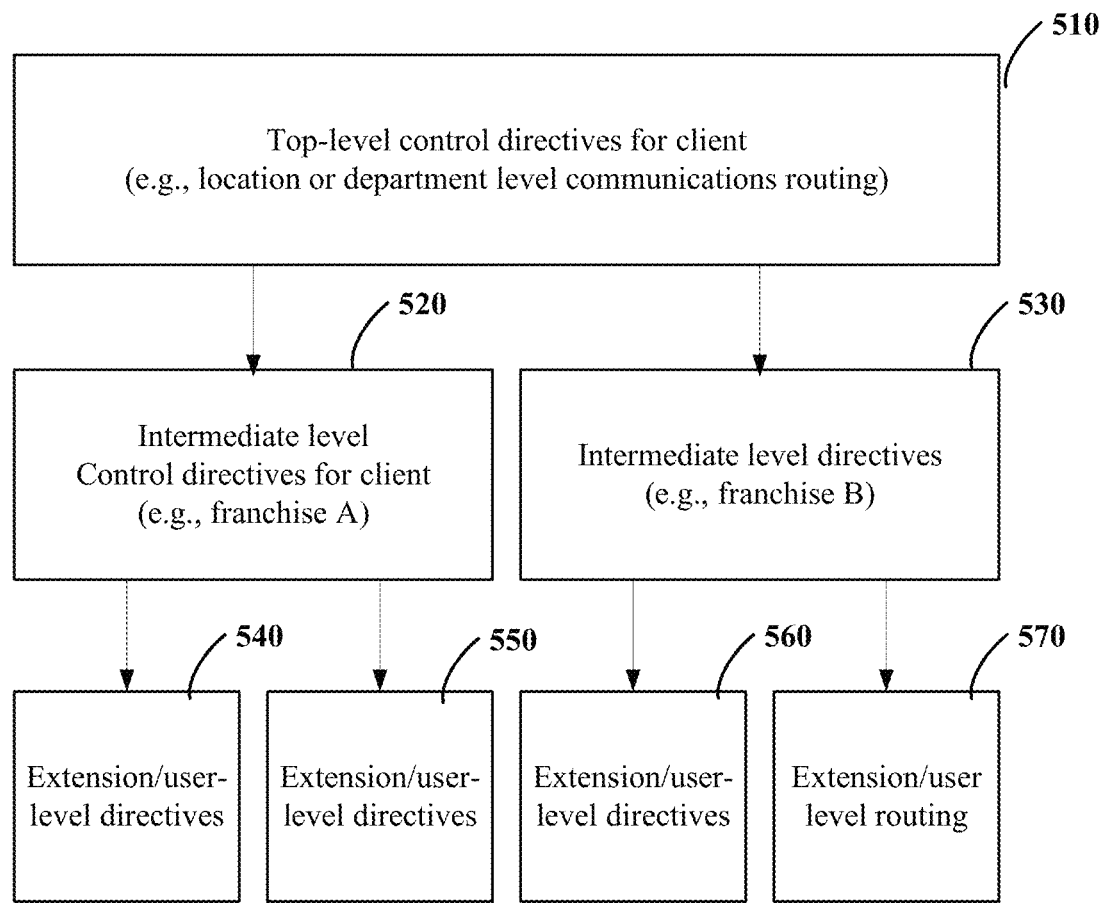
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. The control directives described herein can be used to form programming instructions which can be transmitted to the data communications provider for adjusting the virtual office features provided to the client entity. In this example, block 510 provides a set of top-level control directives that are applicable to all data communications for a client. Blocks 520 and 530 show a set of intermediate-level control directives that are applicable only to a subset of endpoints included in the client account (e.g., for respective IPBXs, branches, department, and/or franchisees). Blocks 540, 550, 560, 570 are shown as lower-level control directives that are applicable to particular extensions and/or end-users of the client account. The lower-level control directives may be useful, for example, for an end-user to customize and/or dynamically adjust direction of communications to an extension throughout the day.

Figure 6:
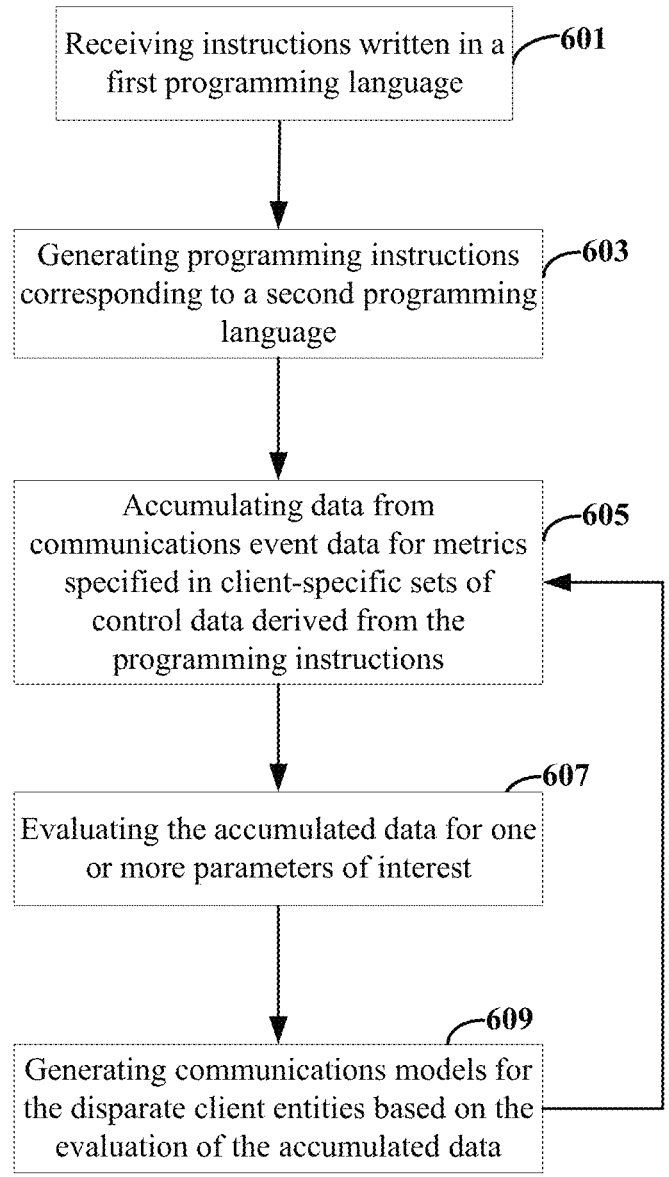
FIG. 6 is a flow diagram showing illustrating a method of customized communication model generation and analytics using a high-level programming interface, consistent with embodiments of the present disclosure.

FIG. 6 is a flow diagram showing a method of customized communication model generation and analytics using a high-level programming interface, consistent with embodiments of the present disclosure. As discussed herein, each client entity may be configured to interface with a data communications provider server providing a database of virtual office features available based on a subscription, via a data communications client server. Each of a plurality of client entities may be associated with one or more different end-users. The data communications provider server may provide a database of virtual office features that are available to the client entities based on a subscription. Each client entity may specify a manner in which the virtual office features provided to the end-users are monitored by the data communications provider, as described herein.

To provide customized communication model generation and analytics using a high-level programming interface, a method may begin at 601 with receiving instructions written in a first programming language. Each of the disparate client entities can receive from a data communications server, a set of instructions written in the first programming language. As described herein, the first programming language corresponds to a message exchange protocol between the data communications server and data sources. The client entities can also receive communication event data for routed data communications. As described herein, the data communications server is configured and arranged to provide a database with a set of virtual office features available to remotely-situated client entities based on a subscription.

Each of a plurality of client entities may specify various virtual office features to be provided to end-users of the client entity. Moreover, each client entity may specify a manner in which the virtual office features are provided to the end-users, as well as a manner in which the virtual office features are monitored. At 603, the method includes generating programming instructions corresponding to a second programming language. For instance, the method may include generating at a client server communicatively coupled to the data communications server and associated with a particular client entity, programming instructions corresponding to the second programming language. As described herein, the second programming language is compatible with the first programming language and further corresponds to the message exchange protocol between the data communications server and data sources.

At 605, the method includes, for each of the plurality of disparate client entities, accumulating data from the communication event data for one or more data metrics specified in a respective set of client-specific control data derived from the programming instructions. That is, each client entity can specify data metrics to be monitored by the data communications provider, via the programming instructions provided to the data communications provider server. Moreover, at 607, the method includes evaluating the accumulated data for one or more parameters of interest specified in the respective client-specific control data. Again, each client entity can specify parameters of interest to be monitored by the data communications provider, via the programming instructions provided to the data communications provider server. Accordingly, at 609, the method includes generating communication models for the disparate client entities based on the evaluation of the accumulated data. As illustrated in FIG. 6, the method may repeat, and communication event data may be repeatedly accumulated, evaluated, and communication models may be generated. In some instances, the client-specific control data defining the data metrics and/or the parameters of interest may also be revised, such that different aspects of the virtual office features for a given client entity are monitored at a given point in time.

MORE DETAILED AND/OR EXPERIMENTAL EMBODIMENTS

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communication control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communication routing decisions for high volumes of communication traffic, as might occur at the edge of a data communications provider's system. These communication routing decisions can, for example, identify a particular branch office or an IPBX of a particular customer. The identified IPBX might then have additional documents written to communicate using a second high-level programming language that is tailored toward more specific communication processing capabilities that might be associated with a particular account or another identifiable grouping. The distinction between the two programming languages can be particularly useful in terms of improving the scalability of the system. For instance, the language used for communication routing decisions can be relatively light weight, with fewer commands and capabilities. In particular implementations, the first (communication routing) language can contain a subset of the commands available in the second (communication processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communication processing XML is that it allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communication routing and the other for providing more complex and specific communication processing functions. In various portions of the present disclosure, the two languages are referred to as either communication processing XML (CPXML) or communication routing XML (CRXML).

The data communications servers providing the underlying function for the PaaS can be configured to utilize a high-level, domain-specific programming language. A particular example language is referred to as Communication Processing eXtensible Markup Language (CPXML). CPXML refers to a communication processing language which defines the message exchange protocol between a communication control server (e.g., an IntraSwitch with a CPXML Engine) and other sources of information, such as databases, web applications, authentication servers, and servers providing various communication-related services. CPXML can allow developers to program communication processing logic or service execution logic with both XML building blocks and JavaScript/TCL, or other scripting languages. In certain implementations, CPXML allows PaaS customer developers to program and integrate data communications flow (e.g., as provided by a cloud-based data communications service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communication control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communications server provider's cloud database). This information can then be used to drive communication flow or communication control decisions.

CRXML defines a limited set of commands to the communication routing logic that allows a customer to define how a communication is initially routed. Maintaining the CRXML as a limited set of simple building block commands can help with the efficiency of the communication control switch. For example, the communication control switch can be located at the perimeter of the data communications provider's routing network, which implies that it may be required to handle a large volume of data communications. The efficiency in processing the large volume of communications can have a significant impact on the performance of the system.

Consistent with various embodiments, the CRXML documents specify a first level of communication routing and simple communication processing that are carried out by the communication control switch. For example, a communication control switch may provide communication routing options for multiple branch offices or locations and for multiple PBXs that support the branch locations. Each branch and PBX may have multiple customer (user) accounts associated therewith. CRXML documents can be used to determine the routing for a communication by identifying a particular branch location, a particular PBX and particular data communications customer account to use in subsequent communication processing and routing. The initial routing decision is indicated by the arrow labelled as "account selection," which shows the passage of control to a communication processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (data communications) endpoint device (or endpoint) includes a communication circuit and (computer) processing circuits which are configured to establish data communications sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for use in a data communications system, comprising:
   receiving from a data communications server, a set of instructions written in a first programming language that corresponds to a communications protocol between the data communications server and data sources, and communication event data for routed data communications, wherein the data communications server is configured and arranged to provide a database with a set of virtual office features available to remotely-situated client entities based on a subscription;
   generating at a client server communicatively coupled to the data communications server and associated with a particular client entity, programming instructions corresponding to a second programming language that is compatible with the first programming language and further corresponds to the communications protocol between the data communications server and data sources, wherein the first programming language is different from a second programming language;
   for each of a plurality of disparate client entities, accumulating data from the communication event data for one or more data metrics specified in a respective set of client-specific control data derived from the programming instructions;
   evaluating the accumulated data for one or more parameters of interest specified in the respective client-specific control data; and
   generating communication models for the disparate client entities based on the evaluation of the accumulated data.

2. The method of claim 1, including generating a communication model for a client entity of the plurality of disparate client entities, based on the communication event data, wherein the generated communication model includes a respective record for each communications link initiated between two participants of the communication, wherein the receiving a set of instructions from the data communications server includes using a communications interface to enable the set of virtual office features.

3. The method of claim 2, wherein generating the communication model for the client entity further includes identifying the two participants connected by a corresponding communications link and a plurality of descriptors of communication events relating to the corresponding communications link.

4. The method of claim 2, wherein the generating of the communication model further includes, in response to a communication event message indicating an event for an existing communications link of the communication, adding a descriptor for the communication event message to a record for the existing communications link in the created communication model.

5. The method of claim 1, including generating a communication model for a client entity of the plurality of disparate client entities, based on the communication event data, wherein the generated communication model includes a respective record for each communications link initiated between two participants of the communication, and each respective record indicates end-users or devices served by the link.

6. The method of claim 1, including generating a communication model for a client entity of the plurality of disparate client entities, based on the communication event data, wherein the generated communication model includes a respective record for each communications link initiated between two participants of the communication, and each respective record indicates communication events corresponding to the link.

7. The method of claim 1, including generating a communication model for a client entity of the plurality of disparate client entities, based on the communication event data, wherein the generated communication model includes a respective record for each communications link initiated between two participants of the communication, and each respective record indicates times of the communication events.

8. The method of claim 1, including generating a communication model for a client entity of the plurality of disparate client entities, based on the communication event data, wherein the generated communication model includes a respective record for each communications link initiated between two participants of the communication, and each respective record indicates performance of the link.

9. The method of claim 1, including monitoring aspects of the virtual office features for each remotely-situated client entity based on the respective subscriptions, and accumulating the communications event data responsive to the monitoring.

10. The method of claim 1, including generating communication summary metrics for the disparate client entities from the communication models, wherein the communication summary metrics are indicative of various statistics characterizing communications among the disparate client entities including at least one of total communication time, caller on hold time, ring time, number of transfers, and number of communication participants.

11. An apparatus for customized communication model generation and analytics using a high-level programming interface, comprising:
    a computing server configured and arranged to:
       interface with remotely-situated client entities using a first programming language that relates to communications protocol between a data communications server and data sources; and provide data communications for a plurality of endpoint devices, each respectively associated with an account of a respective one of a plurality of disparate client entities, by routing data communications for the endpoint of each of the client entities and generating communication event data for the routed data communications; and a processing circuit communicatively coupled to the computing server and configured and arranged to:

receive from each of the plurality of disparate client entities, programming instructions over the communications protocol, the programming instructions corresponding to a second programming language that is compatible with the first programming language, wherein the first programming language is different from the second programming language;

for each of the plurality of disparate client entities, accumulate data from the communication event data for one or more data metrics specified in a respective set of client-specific control data derived from the programming instructions; and evaluate the accumulated data for one or more parameters of interest specified in the respective client-specific control data for generation of communication models for the disparate client entities and implementing data from the communication models to improve performance of the data communications.

12. The apparatus of claim 11, wherein the processing circuit is configured and arranged to:

generate communication models from the communication event data; and adjust routing of data communications to the plurality of endpoint devices based on the communication models.

13. The apparatus of claim 11, wherein the processing circuit is configured and arranged to:

generate communication summary metrics based on the parameters of interest specified in the respective client-specific control data; and adjust routing of data communications to the plurality of endpoint devices based on the communication summary metrics.

14. The apparatus of claim 11, wherein the processing circuit is configured and arranged to:

generate communication models from the communication event data;

generate communication summary metrics from the communication models and based on the parameters of interest specified in the respective client-specific control data; and adjust routing of data communications to the plurality of endpoint devices based on the communication summary metrics.

15. The apparatus of claim 11, wherein the processing circuit is configured and arranged to:

create a communication model in response to a first communication event message indicating a new communication; and add a first record to the created communication model for a first communications link between two participants of the communication, indicated by the first communication event message.

16. The apparatus of claim 15, wherein the processing circuit is configured and arranged to, in response to a second communication event message indicating a second communications link for the communication indicated by the first communication event message, add a second record to the created communication model.

17. The apparatus of claim 11, wherein a record in at least one of the communication models indicates respective addresses for two participants served by a communications link corresponding to the communication record, wherein the processing circuit and the computing server are part of a system in which data associated with the programming instructions are sent from the processing circuit or the computing server to at least one of the remotely-situated client entities to enable virtual office features on behalf of said at least one of the remotely-situated client entities.

18. The apparatus of claim 17, wherein the processing circuit is further configured and arranged to, generate the communication models in response to a communication event message indicating an event for an existing communications link, by adding a descriptor for the communication event message to a record for the existing communications link in the created communication model.

19. The apparatus of claim 11, wherein the processing circuit is further configured and arranged to:

analyze the one or more parameters of interest specified in the respective client-specific control data over a defined period of time;

identify trends in the one or more parameters of interest over the defined period of time; and dynamically modify the communication models for a respective client entity based on the identified trends.

20. The apparatus of claim 11, wherein the processing circuit is configured and arranged to:

generate communication models from the communication event data accumulated from the plurality of disparate client entities; and generate communication summary metrics for a particular client entity based on the communication event data accumulated from the plurality of disparate client entities, and based on the parameters of interest specified in the client-specific control data for the particular client entity.

* * * * *